UNITED STATES PATENT OFFICE.

JEAN GERLACHE, OF BRUSSELS, BELGIUM.

PROCESS OF PRESERVING WOOD.

959,505.  Specification of Letters Patent.  Patented May 31, 1910.

No Drawing.  Application filed April 10, 1909.  Serial No. 489,228.

*To all whom it may concern:*

Be it known that I, JEAN GERLACHE, a subject of the King of Belgium, residing at 2 Rue du Frontispice, Brussels, Belgium, have invented certain new and useful Improvements in Processes of Preserving Wood, of which the following is a specification.

It is known that wood contains about 1% of albuminous materials which rapidly decompose and produce disintegration of the fibers of the wood. It is also known that copper and zinc are antiseptics which act to preserve wood, but that the preservation of wood impregnated with salts of copper or zinc depends not only on the quantity of copper and zinc salts introduced into the wood, but also on the proportion of the quantity used which becomes fixed in the wood. Heretofore it has only been possible to fix very small quantities of these antiseptic salts in wood. Moreover, a considerable fraction of the salts introduced into the wood has remained in the form of crystals soluble in water, while the fraction of the salts combined with the albumen of the wood is reacted upon by the alkaline water, or water charged with carbonic acid, sodium chlorid, etc. present in the wood. Once the wood is deprived of its preserving agent, its decomposition progresses the more rapidly in that the opening of the pores has been accentuated by the mechanical action of crystallization of the antiseptic salts.

To insure against the loss of the salts referred to is the primary object of the present invention.

Another object of the invention is to destroy the albumen in the wood by impregnating the wood with a suitable solution.

Still another object of the invention is to render the wood more durable and stronger.

Various solutions may be utilized for carrying out the invention. For example the following may be used: (1) A solution of free ammonia and of one or several salts of copper dissolved in the ammonia. Any copper salt may be used, such as copper sulfate, carbonate, acetate etc. (2) A solution of free ammonia and of one or several salts of zinc dissolved in the ammonia. Any zinc salt may be used, such as chlorid of zinc etc. (3) A solution of free ammonia and of a mixture of one or several copper salts and of one or several zinc salts, dissolved in the ammonia. These solutions are suitably diluted with water according to the degree of strength desired.

The ammonia in the free state contained in the solution has the effect of dissolving the albumen in the wood, of cleaning the fibers and preparing them for direct contact with the antiseptics, while facilitating the penetration and fixation of said antiseptics. The ammoniacal copper has the effect of dissolving the ligno-cellulose of the wood and of forming therewith a viscous substance which hardens in air. The ammoniacal zinc has very nearly the same effect. When a mixture of copper and zinc salts is used, the zinc has the effect of preventing the combination of cupro-ammonia-cellulose from being attacked by solvents such as alkaline water or water charged with carbonic acid or with sea salt.

The following solution, given by way of example, gives very good results:—1% to 2% of a copper salt or salts, $\frac{1}{2}$ to 1% of a zinc salt or salts, dissolved in ammonia solution, with an excess of free ammonia amounting to from 3 to 7% according to the quantity of antiseptic salts used.

In certain cases and for certain species of wood, when it is desired to make the wood more compact, to harden it, and to preserve it against splitting, an aluminium salt, for example aluminium sulfate may be substituted for the ammonia.

It will be understood that the proportions stated above may be varied, according to the nature of the wood, and according to the nature of the soil where the wood is to be used.

I claim—

1. A process of preserving wood consisting in treating the wood with a solution of free ammonia, and salts of copper and zinc dissolved in said ammonia solution.

2. A process of preserving wood, consisting in treating the wood with a solution of free ammonia, and copper sulfate and a zinc salt dissolved in said ammonia solution.

3. A process of preserving wood consisting in treating the wood with a solution of free ammonia containing ½ per cent. of a copper salt, and ½-1 per cent. of a zinc salt dissolved therein.

4. A process of preserving wood consisting in treating the wood with a solution of free ammonia, and sulfate of copper and chlorid of zinc dissolved in said ammonia solution.

In testimony whereof I have signed my name to this specification in the presence of two subscribing witnesses.

JEAN GERLACHE.

Witnesses:
  Geo. A. Post,
  F. J. Leysene.